(12) United States Patent
Sun et al.

(10) Patent No.: US 10,687,217 B2
(45) Date of Patent: *Jun. 16, 2020

(54) SPECTRUM MANAGEMENT APPARATUS AND METHOD, APPARATUS AND METHOD FOR BASE STATION SIDE AND USER DEVICE SIDE

(71) Applicant: Sony Corporation, Tokyo (JP)

(72) Inventors: Chen Sun, Beijing (CN); Bingshan Hu, Beijing (CN)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/879,045

(22) Filed: Jan. 24, 2018

(65) Prior Publication Data

US 2018/0152846 A1 May 31, 2018

Related U.S. Application Data

(62) Division of application No. 15/217,259, filed on Jul. 22, 2016, now Pat. No. 9,894,529.

(30) Foreign Application Priority Data

Sep. 15, 2015 (CN) .......................... 2015 1 0587090

(51) Int. Cl.
*H04W 40/00* (2009.01)
*H04W 16/10* (2009.01)
(Continued)

(52) U.S. Cl.
CPC ........ *H04W 16/10* (2013.01); *H04B 17/3912* (2015.01); *H04L 43/16* (2013.01); *H04W 16/14* (2013.01); *H04W 24/08* (2013.01); *H04W 48/08* (2013.01); *H04W 52/24* (2013.01); *H04W 74/0808* (2013.01); *H04W 24/02* (2013.01)

(58) Field of Classification Search
CPC ..... H04W 16/02; H04W 16/10; H04W 16/14; H04W 24/02; H04W 24/04; H04W 24/10; H04W 36/00; H04W 36/0055; H04W 36/0072; H04W 36/0077; H04W 36/0061; H04W 36/0066; H04W 36/0083; H04W 36/08
USPC .................. 455/447, 436–438, 67.11, 67.13, 455/226.1–226.3
See application file for complete search history.

(56) References Cited

U.S. PATENT DOCUMENTS

2004/0236547 A1 11/2004 Rappaport
2013/0165134 A1 6/2013 Touag
(Continued)

*Primary Examiner* — Temica M Beamer
(74) *Attorney, Agent, or Firm* — Xsensus LLP

(57) ABSTRACT

The present disclosure provides a spectrum management apparatus and method, as well as an apparatus and method for base station side and user device side of a wireless communication system. The spectrum management apparatus includes: an acquiring unit, configured to acquire spectrum utilization information of at least one wireless communication system on a predetermined frequency band; a determining unit, configured to determine, according to the spectrum utilization information, spectrum utilization efficiency of a corresponding wireless communication system; and an adjusting unit, configured to adjust, based on the spectrum utilization efficiency, spectrum sensing parameters of the corresponding wireless communication system on the predetermined frequency band.

12 Claims, 12 Drawing Sheets

(51) Int. Cl.
*H04W 16/14* (2009.01)
*H04W 48/08* (2009.01)
*H04W 24/08* (2009.01)
*H04L 12/26* (2006.01)
*H04W 52/24* (2009.01)
*H04W 74/08* (2009.01)
*H04B 17/391* (2015.01)
*H04W 24/02* (2009.01)

(56) References Cited

U.S. PATENT DOCUMENTS

| | | |
|---|---|---|
| 2015/0017999 A1 | 1/2015 | Chen |
| 2015/0245333 A1 | 8/2015 | Hulkkonen |
| 2015/0327328 A1 | 11/2015 | Novak |

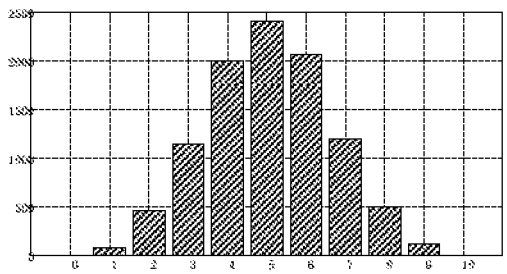
(a)
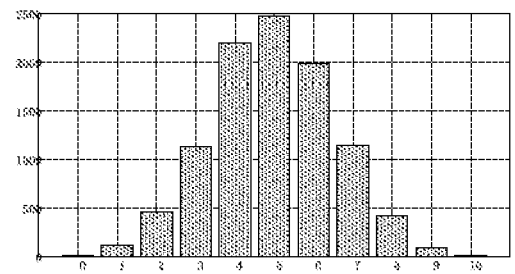
(b)
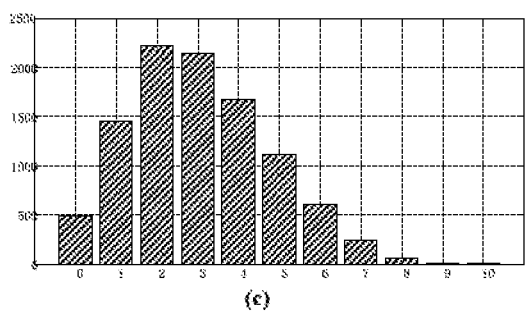
(c)
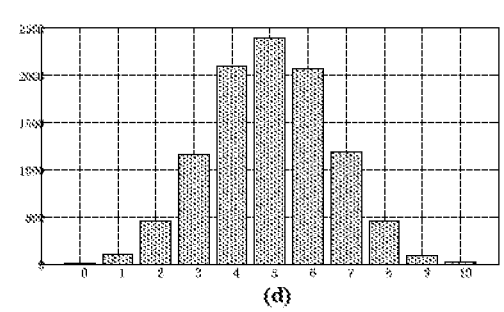
(d)
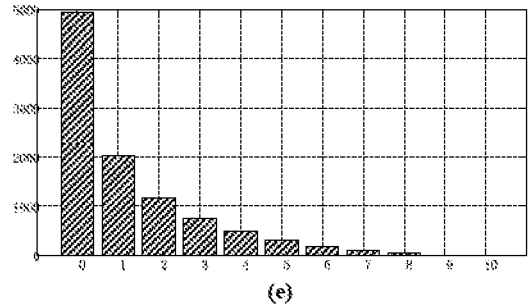
(e)
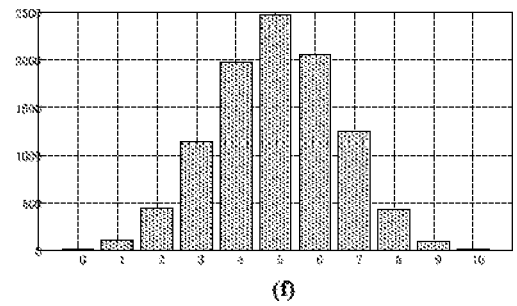
(f)
Fig. 3

SPECTRUM MANAGEMENT APPARATUS AND METHOD, APPARATUS AND METHOD FOR BASE STATION SIDE AND USER DEVICE SIDE

CROSS-REFERENCE TO RELATED APPLICATIONS

This application is a divisional application of U.S. application Ser. No. 15/217,259, filed Jul. 22, 2016, and is based upon and claims the benefit of priority from prior Chinese Patent Application No. 201510587090.3, filed Sep. 15, 2015, the entire contents of both of which are incorporated herein by reference.

FIELD OF THE INVENTION

The embodiments of the present invention generally relate to the field of wireless communications, and particularly relate to co-existence management of multiple systems in wireless communications. More particularly, the embodiments of the present invention relate to a spectrum management apparatus and method, an apparatus and a method for base station side of a wireless communication system, as well as an apparatus and a method for user device side of a wireless communication system.

BACKGROUND OF THE INVENTION

As the wireless network develops and evolves, it carriers more and more service, and thus additional spectrum resources are required to support massive data transmission. The spectrum resources can be denoted for example by parameters such as time, frequency, bandwidth, allowable maximum emitting power and so on. The limited spectrum resources have been assigned to certain operators or services, while new available spectrum is quite rare or cost expensive. In such a situation, a concept of dynamical spectrum utilization is proposed. That is, the spectrum resources which have been assigned to certain systems or services but have not been utilized sufficiently are to be dynamically utilized. These spectrum resources belong to an unlicensed frequency band for the systems which make use of them dynamically. Before using an unlicensed frequency band, a wireless communication system should first determine whether this frequency band is available. Since the communication systems of different operators and the communication systems under different communication protocols have the fair right to use the unlicensed frequency band, how to use the same unlicensed frequency band fairly and effectively has become an urgent problem to be solved by the industry.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an aspect of the present application, there is provided a spectrum management apparatus, including: an acquiring unit, configured to acquire spectrum utilization information of at least one wireless communication system on a predetermined frequency band; a determining unit, configured to determine, according to the spectrum utilization information, spectrum utilization efficiency of a corresponding wireless communication system; and an adjusting unit, configured to adjust, based on the spectrum utilization efficiency, spectrum sensing parameters of the corresponding wireless communication system on the predetermined frequency band.

According to another aspect of the present application, there is provided an apparatus for base station side of a wireless communication system, including: a transmitting unit, configured to transmit spectrum utilization information of a cell served by the base station on a predetermined frequency band to a spectrum management apparatus; and a receiving unit, configured to receive a change in spectrum sensing parameters from the spectrum management apparatus.

According to an aspect of the present application, there is provided an apparatus for user device side of a wireless communication system, including: a receiving unit, configured to receive an instruction for performing spectrum sensing and corresponding spectrum sensing parameters from a base station; a sensing unit, configured to perform the spectrum sensing according to the spectrum sensing parameters in response to the instruction; and a transmitting unit, configured to transmit a result of the spectrum sensing to the base station.

According to another aspect of the present application, there is provided a spectrum management method, including: acquiring spectrum utilization information of at least one wireless communication system on a predetermined frequency band; determining according to the spectrum utilization information, spectrum utilization efficiency of a corresponding wireless communication system; and adjusting, based on the spectrum utilization efficiency, spectrum sensing parameters of the corresponding wireless communication system on the predetermined frequency band.

According to another aspect of the present application, there is provided a method for base station side of a wireless communication system, including: transmuting spectrum utilization information of a cell served by the base station on a predetermined frequency band to a spectrum management apparatus; and receiving a change in spectrum sensing parameters from the spectrum management apparatus.

According to another aspect of the present application, there is provided a method for user device side of a wireless communication system, including: receiving an instruction for performing spectrum sensing and corresponding spectrum sensing parameters from a base station; performing the spectrum sensing according to the spectrum sensing parameters in response to the instruction; and transmitting a result of the spectrum sensing to the base station.

According to another aspect of the present application, there is further provided a wireless communication system, including a base station and a user device. The base station includes the above mentioned apparatus for base station side of the wireless communication system and the user device includes the above mentioned apparatus for user device side of the wireless communication system.

According to other aspects of the present invention, there are further provided computer program codes and computer program product for implementing the above mentioned spectrum management method, the method for base station side and user device side of a wireless communication system, as well as a computer readable storage medium on which computer program codes for realizing the aforementioned spectrum management method, the method for base station side and user device side of a wireless communication system are recorded.

In the embodiments of the present application, by adjusting the spectrum sensing parameters of a wireless communication system according to the spectrum utilization efficiency, the usage of the wireless communication system with respect to the spectrum resources of the predetermined frequency band can be effectively guaranteed, and/or different communication systems are enabled to use the spectrum resources reasonably and effectively.

These and other advantages of the present invention will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings:

FIG. 3 illustrates a simulation result of the probability of activation of the communication systems in the scenario of FIG. 2, in the case of adjusting the spectrum sensing parameters of a communication system;

DETAILED DESCRIPTION OF THE INVENTION

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

The First Embodiment

Figure 1:
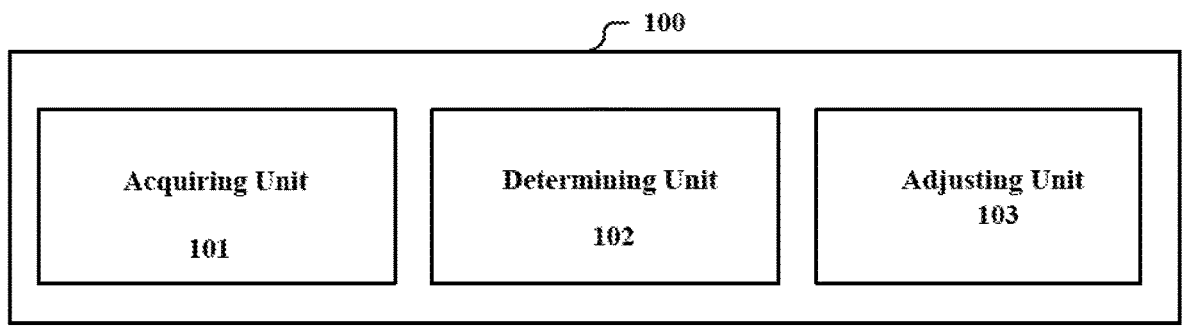
FIG. 1 is a schematic structural block diagram illustrating the spectrum management apparatus according to an embodiment of the present application.

FIG. 1 illustrates a structural block diagram of a spectrum management apparatus 100 according to an embodiment of the present application. As shown in FIG. 1, the spectrum management apparatus 100 includes: an acquiring unit 101, configured to acquire spectrum utilization information of at least one wireless communication system on a predetermined frequency band; a determining unit 102, configured to determine, according to the spectrum utilization information, spectrum utilization efficiency of a corresponding wireless communication system; and an adjusting unit 103 configured to adjust, based on the spectrum utilization efficiency, spectrum sensing parameters of the corresponding wireless communication system on the predetermined frequency band.

Wherein, the predetermined frequency band is a frequency band to be dynamically used or being dynamically used in common by the above mentioned wireless communication systems (hereinafter, referred as a communication system or system simply). In an example, the predetermined frequency band is an unlicensed frequency band, such as 2.4G and 5G frequency band for industrial, research and medical use, or a frequency band which can be used in an unlicensed manner according to the law in each country such as the television frequency band, 3.5 Hz in USA, etc. It is to be understood, the predetermined frequency hand can be any frequency band which is capable of being commonly used by multiple wireless communication systems. Each of the wireless communication systems or a sub-system therein, when aiming to use the predetermined frequency band, should judge whether the frequency band is available, such as whether it has been occupied by another system or another sub-system via, spectrum sensing at first, in order to ensure the validity and fairness of usage of the frequency band.

In the embodiments of the present application, a wireless communication system can be considered as a combination of multiple devices having function of transmitting and receiving. For example, the wireless communication system can be a set consisting of all the base stations and user devices of the same mobile operator, or a set consisting of all the base stations and user devices of the same mobile operator which use the same communication format. The wireless communication system can also be a sub-set of the above mentioned set, for example, the base stations and user devices limited in the management region of the spectrum management apparatus. In addition, the wireless communication system can further be a set of the base stations and user devices of different mobile operators using the same communication format or it is similar to the previously stated sub-set. On the other hand, the wireless communication system can be a set of the base stations and user devices belonging to the same service provider or it is similar to the previously stated sub-set. As an example, in the case of the LTE communication system, the wireless communication system can be a sub-set of the LTE communication system, for example, a group of sub-systems at the cell level. The sub system at the cell level includes for example a base station (macro base station or small base station) and one or more user devices. Of course, the wireless communication system is not limited to the LTE communication system or its sub-set. Instead, it can also be other kind of communication system or its sub-set, such as the WiFi communication system or its sub-set and the like. In addition, in some examples, for example, in the scenario of the device to device communications, the wireless communication system can be appreciated as a device cluster formed by a plurality of user devices. To facilitate description, the embodiments of the specification take a sub-set of the LTE communication system as an application example. However, it should be understood that this is not limiting.

Figure 2:
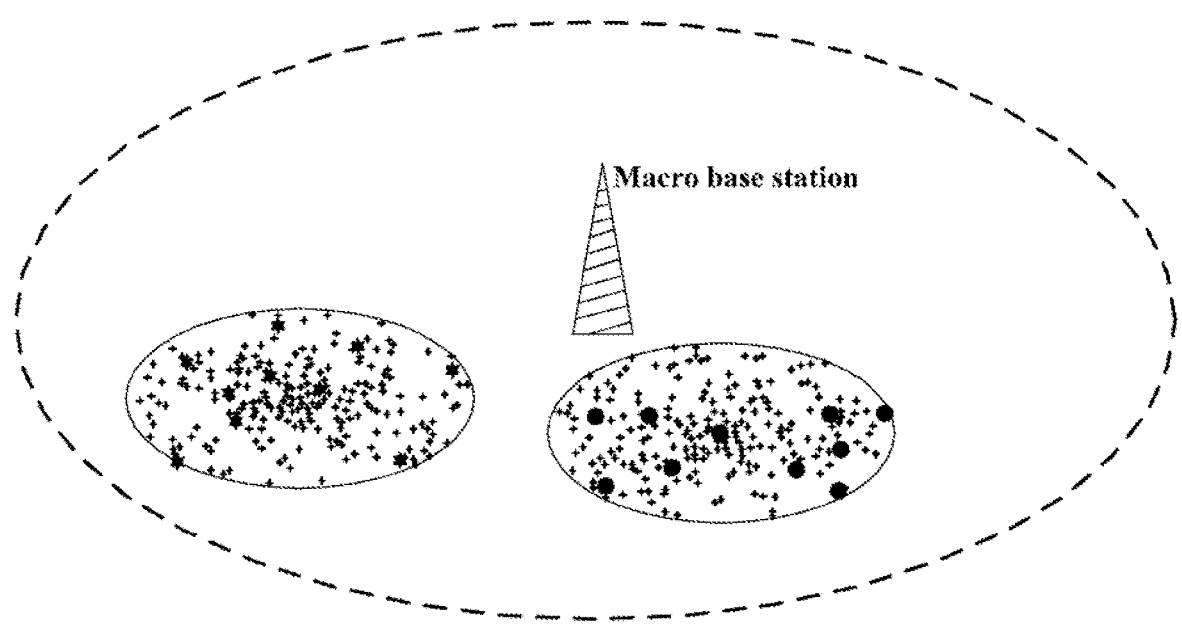
FIG. 2 illustrates an example of the system distribution under the LTE communication system scenario.

One or more wireless communication systems can be arranged in the range of the spectrum management apparatus 100, which manages their behavior of making use of the predetermined frequency band. For ease of understanding, FIG. 2 illustrates an example of the system distribution under the scenario of the L communication system. In FIG. 2, the triangle denotes a macro base station, the pentagrams in the left ellipse denote small cell base stations belonging to the first operator, and circles in the right ellipse denote small cell base stations belonging to the second operator. The devices in the left ellipse can be taken as a wireless communication system and the devices in the right ellipse can be taken as another wireless communication system. Of course, the two communication systems can be managed by the same spectrum management apparatus, or can also be managed by different spectrum management apparatus, which will be described in detail later.

As stated above, in the spectrum management apparatus 100, the acquiring unit 101 acquires the utilization status of each wireless communication system with respect to the predetermined frequency band, so that the determining unit 102 determines the spectrum utilization efficiency of respective communication system. Then, the adjusting unit 103 adjusts the spectrum sensing parameters of respective communication systems according to the spectrum utilization efficiency. Wherein, the spectrum sensing parameters are information of the configuration adopted by the wireless communication system in performing spectrum sensing on the predetermined frequency band. Through changing the spectrum sensing parameters, the wireless communication system for each sub-system therein such as the LTE cell) can be caused to make different judgment as to whether the current spectrum is available, and thus the probability for the wireless communication system to get the spectrum resources and the probability of protection of the existing communication systems are changed. That is, the spectrum utilization efficiency of the wireless communication system is changed.

As an example, the spectrum sensing parameters include at least one of the following: an energy detection threshold for spectrum sensing, time duration for spectrum sensing, the number of nodes involved in sensing and a judgment criterion of spectrum sensing in the case of distributed spectrum sensing.

In the embodiments of the present application, any suitable spectrum sensing technology can be adopted to perform the spectrum sensing. Correspondingly, the spectrum sensing parameters can be any parameters influencing the result of the spectrum sensing during the process. For example, as for a system performing the spectrum sensing by energy detection, if the energy detection threshold is set to be −70 dBm, when the energy detection performed by the system finds that the signal energy in the spectrum of this frequency band is lower than −70 dBm, it is considered that no system is occupying the frequency band and thus it is determined that the spectrum resources are available. At this time, other communication systems may exist. However, due to a long transmission distance, the energy of the signal after reaching the system which is performing the spectrum sensing has been attenuated to be below −70 dBm for example, to −80 dBm, and thus can not be detected. If the energy detection threshold is decreased to −85 dBm, the system which is performing the spectrum sensing would detect the existence of that system and thus determines that the frequency band is not available. Meanwhile, it is to be understood that setting different energy detection threshold would lead to different protection of the existing systems. The higher energy detection threshold increases the chance to use the spectrum, but also increases the probability of producing interferences to the existing systems. On the contrary, decreasing the energy detection threshold will decrease the chance to use the spectrum, but enhance the protection for the existing systems.

In addition, the spectrum sensing duration, i.e., the size of the time window to perform the spectrum sensing can also be adjusted. It can be appreciated that the longer the time duration is, the larger the probability of detecting the existence of the existing communication systems becomes. Thus, the chance of using the spectrum is decreased and the protection for the existing systems is enhanced. Otherwise, the chance of using the spectrum is increased and the protection for the existing systems is weakened.

As another way, distributed spectrum sensing (i.e., coordinated sensing) can also be adopted. In this situation, spectrum sensing such as the above mentioned energy detection is performed by a plurality of independent communication devices such as a plurality of base stations in different positions. Then, the results are aggregated in a central judgment apparatus to perform the judgment whether the spectrum is available. The central judgment apparatus can be located in a certain base station or in the spectrum management apparatus, for example. In another example, the communication devices performing the spectrum sensing can further include the user devices. The user device and the base station can be generally referred as nodes.

Since the final judgment is performed according to the spectrum sensing results of multiple nodes in the central judgment apparatus, factors such as the number of nodes involved in sensing and the judgment criterion of spectrum sensing will affect the probability of succeeding, in getting the spectrum. The judgment criterion of spectrum sensing may include for example the AND principle, the OR principle, the proportion principle or the like. The AND principle means that only when all the nodes determines that the predetermined frequency band is available, the frequency band is finally determined to be available. The OR principle means that if one node determines that the predetermined frequency band is available, the frequency band is finally determined to be available. The proportion principle means that if the nodes determining that the predetermined frequency band is available accounts for a preset proportion of the nodes performing the spectrum sensing, the frequency hand is finally determined to be available. It is to be understood that, in the case that the number of nodes is the same, when adopting the OR principle, the communication system will have a higher chance to obtain the spectrum resources, while the AND principle will cause the communication system to obtain the spectrum resources in a quite conservative way, realizing better protection for the existing systems.

The adjusting unit 103 can adjust one of the above mentioned several spectrum sensing parameters, or adjust two or more thereof simultaneously. Moreover, the spectrum sensing parameters are not limited to the above examples, and can include other parameters depending on different spectrum sensing technology.

For example, the adjusting unit 103 can adjust, in the case that the spectrum utilization efficiency deviates from an expected value, the spectrum sensing parameters of the corresponding wireless communication system, so that its spectrum utilization efficiency reaches the expected value. The expected value is a target value of the spectrum utilization efficiency of the corresponding communication system. It can be preset by the spectrum management apparatus 100, or can be adjusted automatically or manually during the operation.

The actual spectrum utilization efficiency of the communication system is determined by the determination unit 102 based on the spectrum utilization information acquired by the acquiring unit 101. As an example, the spectrum utilization information includes at least one of the following: information of actual activation status of each cell in the wireless communication system after spectrum sensing, throughput of the wireless communication system, and a signal to noise ratio of the wireless communication system. For example, when the spectrum utilization information is the information of actual activation status of each cell, the spectrum utilization efficiency can be denoted by the number of the activated cells or the proportion thereof.

For example, in the case that the spectrum sensing parameters are the energy detection threshold, the adjusting unit 103 is configured to, in the case of the spectrum utilization efficiency being higher than the expected value, decrease the energy detection threshold of the corresponding wireless communication system, and or in the case of the spectrum utilization efficiency being lower than the expected value, increase the energy detection threshold of the corresponding wireless communication system. This is because when the energy detection threshold decreases, the probability for the wireless communication system to obtain the spectrum resources decreases, and correspondingly the ratio of the spectrum resource utilization would decrease.

It should be noted that, although adjusting spectrum sensing parameters is described in the above with respect to the wireless communication system, that is, the wireless communication system is adjusted as a whole, adjusting can also be performed only with respect to its sub-system, or different adjusting is performed on different sub-systems. For example, different spectrum sensing parameters can be set for different LTE cells, or different parameter adjusting can be performed for different LTE cells.

The adjusting unit 103 can perform the above mentioned adjusting based on a preset system model. In the preset system model, the relationship between the spectrum sensing parameters and the spectrum utilization efficiency is reflected. For example, the preset system model can include at least one of the following: a channel model, a service model, a model of probability for spectrum activation of the system, a geographical location model.

Taking the model of probability for spectrum activation of the system as an example, it can be calculated from the actual service model that the number of the activated cells follows the Poisson distribution. Or, each cell is assumed to be provided with an activation probability according to its service requirement. The activated cells perform the spectrum sensing and it is determined whether the predetermined frequency band is available. At last, the spectrum utilization efficiency of the system can be calculated by statistics. By changing the spectrum sensing parameters such as the energy detection threshold, the expected spectrum utilization efficiency can be achieved.

In an example, different expected values of spectrum utilization efficiency can be set for wireless communication systems with different priority levels of utilizing the spectrum. For example, a system with a higher priority level is provided with a higher expected value. Of course, the expected value of the spectrum utilization efficiency of a communication system can also be set according to its service category, payment state and the like.

In addition, the acquiring unit 101 can be further configured to acquire information indicating an identifier of each cell in the wireless communication system, and the determining unit 102 is configured to determine whether a cell in an active state and a cell failing to be activated are systems of the same type based on the information indicating the identifier of each cell in the wireless communication system, wherein, the adjusting unit 103 can be configured to perform the adjusting in the case that the determining unit 102 determines that cell in the active state and the cell failing to be activated are systems of the same type.

Here, the systems of the same type refer to one of the following cases: the systems use the same spectrum access strategy, for example, all of them are LTE cells or all of them are WiFi cells; or they belong to the same mobile operator or the same service provider. Moreover, the information of the identifier of the cell can be an ID of the cell or a reference signal of the cell. The spectrum management apparatus 100 knows information of the ID assignment and the assignment of reference signal of cells of different wireless communication systems in advance. Therefore, the determining unit 102 can determine whether two cells are systems of the same type according to the acquired information of the identifier.

The adjusting unit 103 can performs the adjusting only in the case of being systems of the same type.

As for a LTE communication system, the spectrum management apparatus 100 can be located at the base station side, for example, implemented by the macro base station or the small base station. Alternatively, it can also be located in the core network, for example, implemented by the evolved packet core (EPC) under the LTE protocol. In addition, in a current system complying with IEEE 802.19.1 standard, the spectrum management apparatus 100 can be implemented in the co-existence manager (CM).

In an example, the acquiring unit 101 can acquire the above mentioned spectrum utilization information (and the information of the identifier of the cell, or the like) via a wired manner. For example, the transmission of the information can be performed through the backhaul connection from the base station to the spectrum management apparatus 100 located in the core network.

In another example, the predetermined frequency band is an unlicensed frequency band and the acquiring unit 101 acquires the spectrum utilization information via wireless communication in a licensed frequency band. For example, when the spectrum management apparatus 100 is located in the base station, it is possible to perform the transmission of information in this way.

In this embodiment, the number of the wireless communication systems managed by the spectrum management apparatus 100 can be two or more. In such a situation, as an example, the adjusting unit 103 can be configured to adjust, with respect to a wireless communication system the spectrum utilization efficiency of which does not reach the expected value, the spectrum sensing parameters of the wireless communication system without influencing the spectrum utilization efficiency of the other wireless communication systems. For example, the determining unit 102 can be caused to determine the spectrum utilization efficiency of the other wireless communication systems according to a system simulation model. The system simulation model mentioned herein can be the previously stated channel model, service model, model of probability for spectrum activation of the system, geographical location model or the like. For example, if the determining unit 102 determines that the spectrum utilization efficiency of the other wireless communication systems is influenced, the above adjusting is not performed.

In this example, different wireless communication systems can belong to different mobile operators or different service providers.

Taking the scenario shown in FIG. 2 as an example, FIG. 3 illustrates a simulation result of the probability of activation of the communication system on the right side (the second communication system, belonging to the second operator) and the communication system on the left side (referred as the first communication system, belonging to the first operator), in the case that the adjusting unit 103 adjusts the spectrum sensing parameters of the first communication system. In the simulation, the above mentioned model of probability for spectrum activation of the system is adopted. Each communication system includes 10 cells in total respectively, and the probability of activation for each cell is assumed to be 50%. The histogram in FIG. 3 illustrates a graph of statistical distribution of the number of the activated cells, when 10000 simulations are performed in the case of changing the energy detection threshold of the first communication system. The horizontal axis denotes the number of the activated cells, and the vertical axis denotes the number of occurrences of the event of activating the corresponding number of cells in the 10000 experiments. The (a), (c) and (e) on the left side of FIG. 3 denotes the simulation result for the first communication system, and (b), (d) and (f) on the right side of FIG. 3 denotes the simulation result for the second communication system. The (c) of FIG. 3 is obtained in the case that the energy detection threshold is decreased compared with the case of (a). It can be seen that, the probability of being activated is decreased for most cells, that is, the probability that the cells obtain the spectrum resources decreases and the spectrum utilization efficiency of the system is low. The (e) of FIG. 3 is obtained in the case that the energy detection threshold is further decreased, and the spectrum utilization efficiency of the system is further lowered at this time. In the case of changing the energy detection threshold of the first communication system, the energy detection threshold of the second communication system keeps unchanged. Moreover, it can be seen from (b), (d) and (f) of FIG. 3, the probability that the cells of the second communication system obtain the spectrum resources substantially keeps unchanged. This is because that, the primary interferences originate from the co-existence interferences among cells of itself, and thus the adjustment of the energy detection threshold of the first communication system does not influence it much.

It can be seen that, in this example, the spectrum management apparatus 100 operates as a centralized management apparatus. It manages multiple wireless communication systems, so that the multiple systems utilize the spectrum resources reasonably. For example, the spectrum management apparatus can be a geographical location database.

In the present embodiment, by adjusting the spectrum sensing parameters of the managed wireless communication system according to the spectrum utilization efficiency, the usage of the wireless communication system with respect to the spectrum resources of the predetermined frequency band can be effectively guaranteed, and/or different communication systems are enabled to use the spectrum resources reasonably and effectively.

The Second Embodiment

Figure 4:
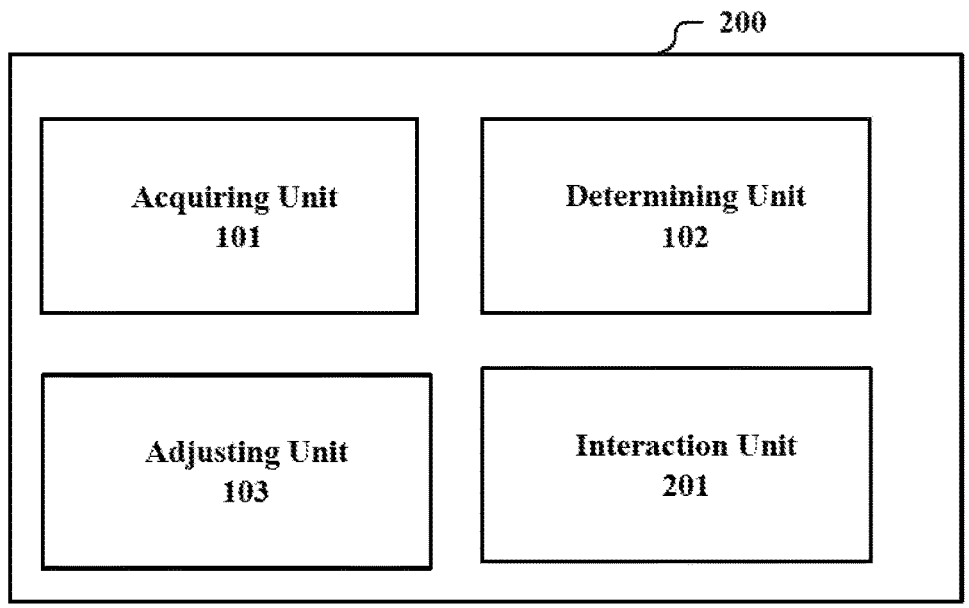
FIG. 4 is a schematic structural block diagram illustrating the spectrum management apparatus according to another embodiment of the present application.

FIG. 4 illustrates a structural block diagram of the spectrum management apparatus 200 according, to another embodiment of the present application. Besides the units shown in FIG. 1, the spectrum management apparatus 200 further includes: an interaction unit 201, configured to interact with other spectrum management apparatus so that the adjusting unit 103 performs the adjusting while taking into consideration the influence to the other wireless communication systems. In this embodiment, the number of the wireless communication systems managed by the spectrum management apparatus is one.

Still taking FIG. 2 as an example, at this time, the first communication system and the second communication system are each provided with a respective spectrum management apparatus. Therefore, a kind of distributed management is realized in tins embodiment.

In an example, the interaction unit 201 is configured to transmit a parameter changing request to the other wireless communication apparatus in the case that the adjusting unit 103 has performed adjusting, and receive a feedback from the other wireless communication apparatus. The adjusting unit 103 further adjusts the spectrum sensing parameters according to the feedback. This operation of the interaction unit 201 can avoid the influence to the other wireless communication systems.

The feedback can indicate whether the spectrum utilization efficiency of the wireless communication systems managed by the other spectrum management apparatus is influenced, and the adjusting unit 103 is configured to, in the case that the feedback indicates that the spectrum utilization efficiency of the wireless communication systems managed by the other spectrum management apparatus is influenced, re-adjust the spectrum sensing parameters. For example, the spectrum sensing parameters are re-adjusted to a value between the original value and the adjusted value, or re-adjusted to the original value, and the like. In other words, if the feedback indicates that the spectrum utilization efficiency of the wireless communication systems managed by the other spectrum management apparatus is not influenced, the adjusted spectrum sensing parameters are maintained. The feedback is made by the other spectrum management apparatus according to for example the spectrum utilization efficiency of its managed wireless communication system.

In addition, when the interaction unit 201 receives the parameter changing request from the other spectrum management apparatus, the acquiring unit 101 acquires the spectrum utilization information of the wireless communication system, the determining unit 102 determines the spectrum utilization efficiency of the wireless communication system and determines whether the spectrum utilization efficiency is influenced, and the interaction unit 201 provides the feedback indicating whether the spectrum utilization efficiency is influenced to the other spectrum management apparatus. Therefore, upon receiving the parameter changing request, the spectrum management apparatus 200 measures the spectrum utilization efficiency of its managed wireless communication system and feedbacks.

It can be seen that, the spectrum management apparatus of the embodiment just needs to interchange simple commands between them to achieve cooperation among different communication systems, so that they utilize the spectrum resources on the predetermined frequency band commonly in a reasonable way.

The Third Embodiment

Figure 5:
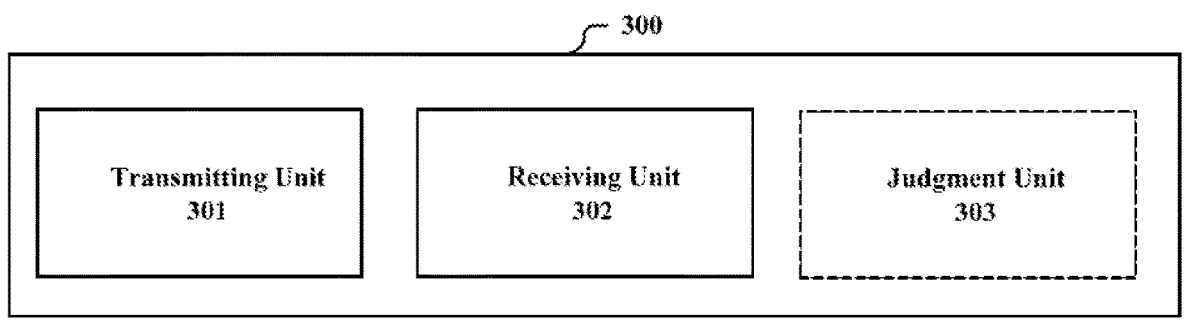
FIG. 5 is a schematic structural block diagram illustrating the apparatus for base station side of a wireless communication system according to an embodiment of the present application.

FIG. 5 illustrates a structural block diagram of the apparatus 300 for base station side of a wireless communication system according to an embodiment of the present application. The apparatus 300 includes: a transmitting unit 301, configured to transmit spectrum utilization information of a cell served by the base station on a predetermined frequency band to a spectrum management apparatus; and a receiving unit 302, configured to receive a change in spectrum sensing parameters from the spectrum management apparatus.

As stated previously, the spectrum management apparatus can be located at the base station side, for example, implemented by the macro base station or the small base station. Alternatively, it can also be located in the core network, for example, implemented by the EPC under the LTE protocol. In addition, in a current system complying with WEE 802.19.1 standard, the spectrum management apparatus can be implemented in the co-existence manager (CM). As an example, the spectrum management apparatus can be the previously mentioned spectrum management apparatus 100 or 200, but not limited thereto. In addition, the explanation about the predetermined frequency band and the wireless communication system is similar to that in the first embodiment, and will not be repeated herein.

When a cell served by the base station is to utilize the predetermined frequency band, the spectrum sensing is to be performed at first. The spectrum sensing can be executed by the base station separately, or can be executed with the assistance of its user devices. Further, the spectrum sensing can be executed in cooperation with the other base stations and/or the user devices of the other base stations. When the result of spectrum sensing indicates that the predetermined frequency band is available, the cell makes use of this predetermined frequency band. The base station reports the utilization information of its seared cells with respect to the predetermined frequency band to the spectrum management apparatus, so that the spectrum management apparatus acquires the spectrum utilization efficiency of the corresponding wireless communication system.

In an example, the spectrum utilization information includes at least one of the following: information of actual activation status of the cell after spectrum sensing, throughput of the base station, and a signal to noise ratio of the base station. After each base station reports the spectrum utilization information, the spectrum management apparatus can acquire the spectrum utilization efficiency of the whole communication system, so as to decide whether to adjust the spectrum sensing parameters.

When the spectrum management apparatus decides that it is necessary to change the spectrum sensing parameters, it notifies the base station of the change to be made, so that the base station performs the spectrum sensing using the changed spectrum sensing parameters.

For example, the spectrum sensing parameters include at least one of the following: an energy detection threshold for spectrum sensing time duration fix spectrum sensing, the number of nodes involved in sensing and a judgment criterion of spectrum sensing in the case of distributed spectrum sensing. Upon the receiving unit 302 receives the change of the spectrum sensing parameters, the base station uses the changed spectrum sensing parameters when performing the spectrum sensing. In the case that the user devices assist the base station in performing the spectrum sensing, the base station further notifies the user devices of the change of the spectrum sensing parameters. The detailed description about the spectrum sensing parameters has been present in the first embodiment, and will not be repeated herein. As stated above, since the change of the spectrum sensing parameters may affect the probability for obtaining the spectrum resources, the spectrum utilization efficiency of the system may be changed.

As shown by the dotted line block in FIG. 5, the apparatus 300 can further include: a judgment unit 303, configured to judge whether the predetermined frequency band is available based on the spectrum sensing result of the base station.

In an example, the receiving unit 302 is further configured to receive the spectrum sensing results from other nodes, and the judgment unit 303 is further configured to perform the judging based on the spectrum sensing results from the other nodes. The other nodes herein include user devices and/or other base stations. The judgment unit 303 judges whether the predetermined frequency band is available based on the spectrum sensing results from multiple nodes (including the present base station). It can be understood that, in this example, the apparatus 300 operates as a central judgment apparatus in the distributed spectrum sensing.

The judgment unit 303 would perform the final judgment according to the judgment criterion of spectrum sensing set in the spectrum sensing parameters, using the spectrum sensing results from the nodes, the number of which is set in the spectrum sensing parameters. The detailed description about the judgment criterion has been given in the first embodiment, and will not be repeated here. When these nodes are performing spectrum sensing, they adopt the energy detection threshold and the time duration for spectrum sensing set in the spectrum sensing parameters.

In addition, the judgment unit 303 can further judge, in the case that the predetermined frequency band is unavailable, judge whether the present cell and a cell already occupying the predetermined frequency band are systems of the same type, and the transmitting unit 301 provides a result of the judging to the spectrum management apparatus. As stated previously, the systems of the same type refer to one of the following cases: the systems use the same spectrum access strategy, for example, all of them are LTE cells or all of them are WiFi cells; or they belong to the same mobile operator or the same service provider, for example, the cells located in the same ellipse of one side in the example of FIG. 2 are systems of the same type.

In this situation, the spectrum management apparatus can perform the adjusting of the spectrum sensing parameters for example when receiving the notification of being systems of the same type. Otherwise, it does not perform the adjusting.

The judgment unit 303 can perform the judging of whether being systems of the same type based on at least one of the following: information of an identifier of the cell, reference signal detection. The reference signal detection is for example the preamble detection in WiFi, the synchronization signal detection in LTE or the like. Such information can be extracted from the signals acquired during the spectrum sensing. Since the cells of different wireless communication systems have different information of the identifier and different formats and/or content of the reference signal, it is possible to judge whether the cells are systems of the same type by the information.

In this embodiment, the apparatus 300 can report the spectrum utilization status to the spectrum management apparatus, and change the spectrum sensing parameters according to the instruction of the spectrum management apparatus, thereby realizing reasonable utilization of the spectrum resources.

The Fourth Embodiment

Figure 6:
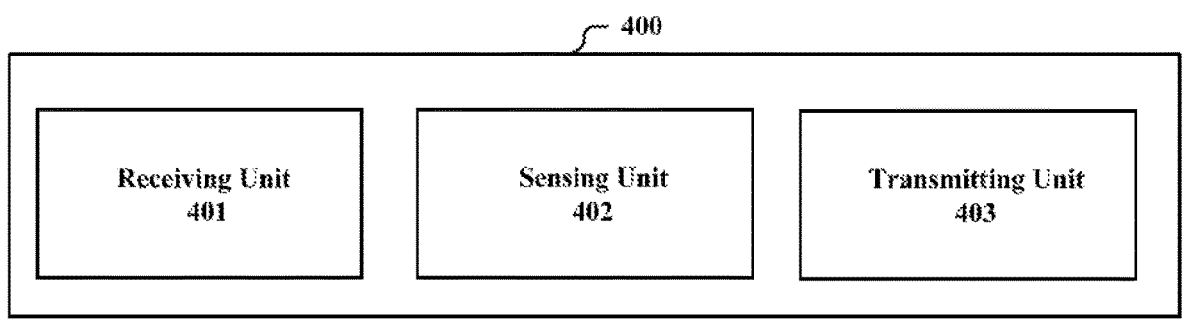
FIG. 6 is a schematic structural block diagram illustrating the apparatus for user device side of a wireless communication system according to an embodiment of the present application.

FIG. 6 illustrates a structural block diagram of the apparatus 400 for user device side of a wireless communication system according to an embodiment of the present application. The apparatus 400 includes: a receiving unit 401, configured to receive an instruction for performing spectrum sensing and corresponding spectrum sensing parameters from a base station; a sensing unit 402, configured to perform the spectrum sensing according to the spectrum sensing parameters in response to the instruction; and a transmitting unit 403, configured to transmit a result of the spectrum sensing to the base station.

As stated previously, the spectrum sensing parameters include at least one of the following: an energy detection threshold for spectrum sensing, time duration for spectrum sensing, the number of nodes involved in sensing and a judgment criterion of spectrum sensing in the case of distributed spectrum sensing.

In this embodiment, the user device assists the base station in performing the spectrum sensing. Specifically, when the base station needs to perform the spectrum sensing, it notifies the user device. The user device notifies the base station of the result after finishing sensing, so that the base station can judge whether the predetermined frequency band is available. When the base station receives the change of the spectrum sensing parameters notified by the spectrum management apparatus, it also notifies the user device accordingly, so that the user device performs the spectrum sensing in accordance with the changed spectrum sensing parameters. As stated previously, since the change of the spectrum sensing parameters may influence the probability of obtaining the spectrum resources, the spectrum utilization efficiency of the system may be changed.

In this embodiment, the user device can receive the setting of the spectrum sensing parameters, and performs the spectrum sensing according to such setting, so as to use the spectrum resources reasonably.

The Fifth Embodiment

It is apparent that some processing or methods are also disclosed in the description above on the spectrum management apparatus and the apparatus for base station side and user device side of a wireless communication system according to embodiments of the present invention. Below, the summary of the methods is described without repeating the details which are already discussed above, however, it should be noted that although disclosed in the description of the spectrum management apparatus and the apparatus for base station side and user device side of a wireless communication system, the methods do not certainly employ or are not certainly executed by the aforementioned components. For instance, embodiments of the spectrum management apparatus and the apparatus for base station side and user device side of a wireless communication system may be partially or completely achieved by hardware and/or firmware, and the method described below may be fully achieved by a computer-executable program, although the methods may employ the hardware and/or firmware of the spectrum management apparatus and the apparatus for base station side and user device side of a wireless communication system.

Figure 7:
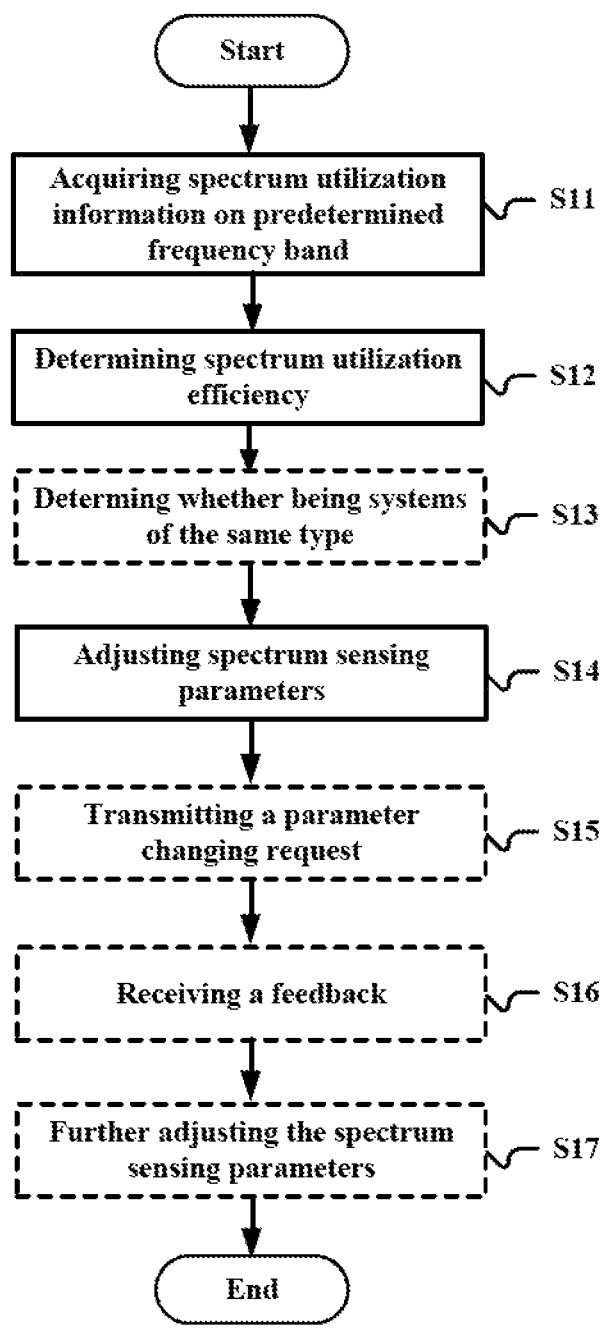
FIG. 7 is a flowchart illustrating the spectrum management method according to n embodiment of the present application.

FIG. 7 illustrates a flowchart of the spectrum management method according to an embodiment of the present application. The method includes: acquiring spectrum utilization information of at least one wireless communication system on a predetermined frequency hand (S11); determining, according to the spectrum utilization information, spectrum utilization efficiency of a corresponding wireless communication system (S12); and adjusting, based on the spectrum utilization efficiency, spectrum sensing parameters of the corresponding wireless communication system on the predetermined frequency band (S14).

Wherein, the spectrum utilization information can include at least one of the following: information of actual activation status of each cell in the wireless communication system after spectrum sensing, throughput of the wireless communication system, and a signal to noise ratio of the wireless communication system.

The spectrum sensing parameters can include at least one of the following: an energy detection threshold for spectrum sensing, time duration for spectrum sensing, the number of nodes involved in sensing and a judgment criterion of spectrum sensing in the case of distributed spectrum sensing.

In an example, in the step S14, in the case that the spectrum utilization efficiency deviates from an expected value, the spectrum sensing parameters of the corresponding wireless communication system is adjusted, so that its spectrum utilization efficiency reaches the expected value. For example, in the step S14, the adjusting can be performed based on a preset system model. The preset system model includes at least one of the following: a channel model, a service model, a model of probability for spectrum activation of the system, a geographical location model. In addition, different expected values of spectrum utilization efficiency can be set for wireless communication systems with different priority levels of utilizing the spectrum.

For example, in the case of the spectrum sensing parameters being an energy detection threshold, in the step S14, if the spectrum utilization efficiency is higher than the expected value, the energy detection threshold of the corresponding wireless communication system is decreased, and/or if the spectrum utilization efficiency is lower than the expected value, the energy detection threshold of the corresponding wireless communication system is increased.

In the step S11, the spectrum utilization information can be acquired via a wired manner. In an example, the predetermined frequency band is an unlicensed frequency band and in the step S11, the spectrum utilization information is acquired via wireless communication in a licensed frequency band.

In the step S11, it is further possible to acquire information indicating an identifier of each cell in the wireless communication system. As shown by the dotted line block in FIG. 7, the method can further include a step S13 before the step S14. In step S13, it is determined whether a cell in an active state and a cell failing to be activated are systems of the same type based on the information indicating the identifier of each cell in the wireless communication system, for example, by detecting the signals during the spectrum sensing, extracting information of the cell ID from therein and determining. If it is a WiFi signal, the determining can be further performed by detecting its preamble information. In the case of determining that the cell in the active state and the cell failing to be activated are systems of the same type, the adjusting of step S14 is performed.

In an example, the number of the managed wireless communication systems is two or more. In step S14, with respect to a wireless communication system the spectrum utilization efficiency of which does not reach the expected value, the spectrum sensing parameters of the wireless communication system are adjusted without influencing the spectrum utilization efficiency of the other wireless communication systems. Wherein, the spectrum utilization efficiency of the other wireless communication systems can be determined according to a system simulation model in the step S12. The examples of the system simulation model are as stated above, and will not be repeated here.

In this example, different wireless communication systems belong to different mobile operators or service providers. The above mentioned method can be implemented for example in a geographical location database.

In addition, in another example, the number of the wireless communication systems managed by the spectrum management apparatus is one, and in step S14, interacting with other spectrum management apparatus is performed so that the adjusting is performed while taking into consideration the influence to the other wireless communication systems.

For example, the above mentioned method can further include the following step: transmitting a parameter changing request to the spectrum management apparatus of the other wireless communication apparatus in the case of performing the adjusting in step S14 (S15), receiving a feedback from the other wireless communication apparatus (S16), and further adjusting the spectrum sensing parameters according to the feedback (S17).

Wherein, the feedback indicates whether the spectrum utilization efficiency of the wireless communication systems managed by the other spectrum management apparatus is influenced, and in the step S17, in the case that the feedback indicates that the spectrum utilization efficiency of the wireless communication systems managed by the other spectrum management apparatus is influenced, the spectrum sensing parameters can be re-adjusted, for example, be re-adjusted back to the original value or be re-adjusted to a value between the original value and the adjusted value, or the like.

In addition, although not shown in the Figure, the above mentioned method can further include the following steps: receiving the parameter changing request from the spectrum management apparatus of the other wireless communication system; acquiring the spectrum utilization information of the wireless communication system; determining the spectrum utilization efficiency of the wireless communication system and determining whether the spectrum utilization efficiency is influenced; and providing the feedback indicating whether the spectrum utilization efficiency is influenced to the above mentioned spectrum management apparatus.

Figure 8:
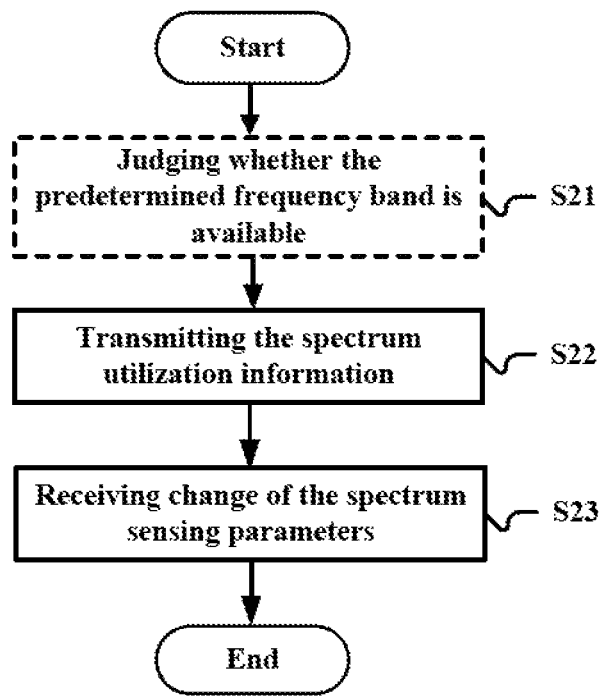
FIG. 8 is a flowchart illustrating, the method for base station side of a wireless communication system according to an embodiment of the present application.

FIG. 8 illustrates a flowchart of the method for base station side of a wireless communication system according to another embodiment of the present application. The method includes: transmitting spectrum utilization information of a cell served by the base station on a predetermined frequency band to a spectrum management apparatus (S22); and receiving a change in spectrum sensing parameters from the spectrum management apparatus (S23).

Wherein, the spectrum utilization information includes at least one of the following information of actual activation status of the cell after spectrum sensing, throughput of the base station, and a signal to noise ratio of the base station.

The spectrum sensing parameters can include at least one of the following: an energy detection threshold for spectrum sensing, time duration for spectrum sensing, the number of nodes involved in sensing and a judgment criterion of spectrum sensing in the case of distributed spectrum sensing.

In addition, as shown by the dotted line block in FIG. 8, the above method can further include a step S21: judging whether the predetermined frequency band is available based on the spectrum sensing result. The spectrum sensing result can be the spectrum sensing result of the base station itself, or can include the spectrum sensing result received from the other nodes (including the base station and the user device), i.e., a distributed sensing manner is adopted.

In addition, in the Step 21, in the case of judging that the predetermined frequency band is unavailable, it is further judged whether the present cell and a cell already occupying the predetermined frequency band are systems of the same type, and a result of the judging is provided to the spectrum management apparatus in step S22. For example, the judging of whether being systems of the same type can be performed based on at least one of the following: information of an identifier of the cell, reference signal detection.

Figure 9:
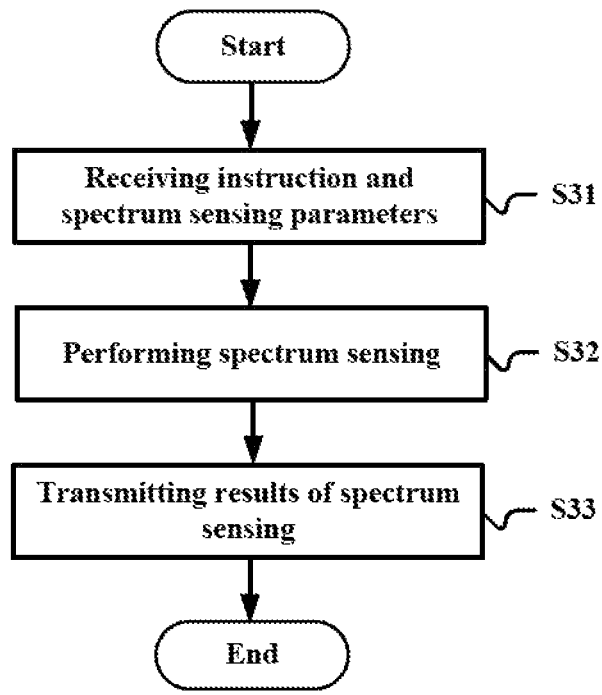
FIG. 9 is a flowchart illustrating the method for user device side of a wireless communication system according to an embodiment of the present application.

FIG. 9 illustrates a flowchart of the method for user device side of a wireless communication system according to another embodiment of the present application. The method includes: receiving an instruction for performing spectrum sensing and corresponding spectrum sensing parameters from a base station; performing the spectrum sensing according to the spectrum sensing parameters in response to the instruction; and transmitting a result of the spectrum sensing to the base station.

Wherein, the spectrum sensing parameters can include at least one of the following: an energy detection threshold for spectrum sensing, time duration for spectrum sensing, the number of nodes involved in sensing and a judgment criterion of spectrum sensing in the case of distributed spectrum sensing.

It is to be noted that, the above mentioned methods can be adopted separately or in combination, the details of which have been described in detail in the first to the fourth embodiment and will not be repeated here.

In addition, in the above description, a communication system is also disclosed, including a base station and a user device, the base station includes the apparatus 300, and the user device includes the apparatus 400.

Figure 10:
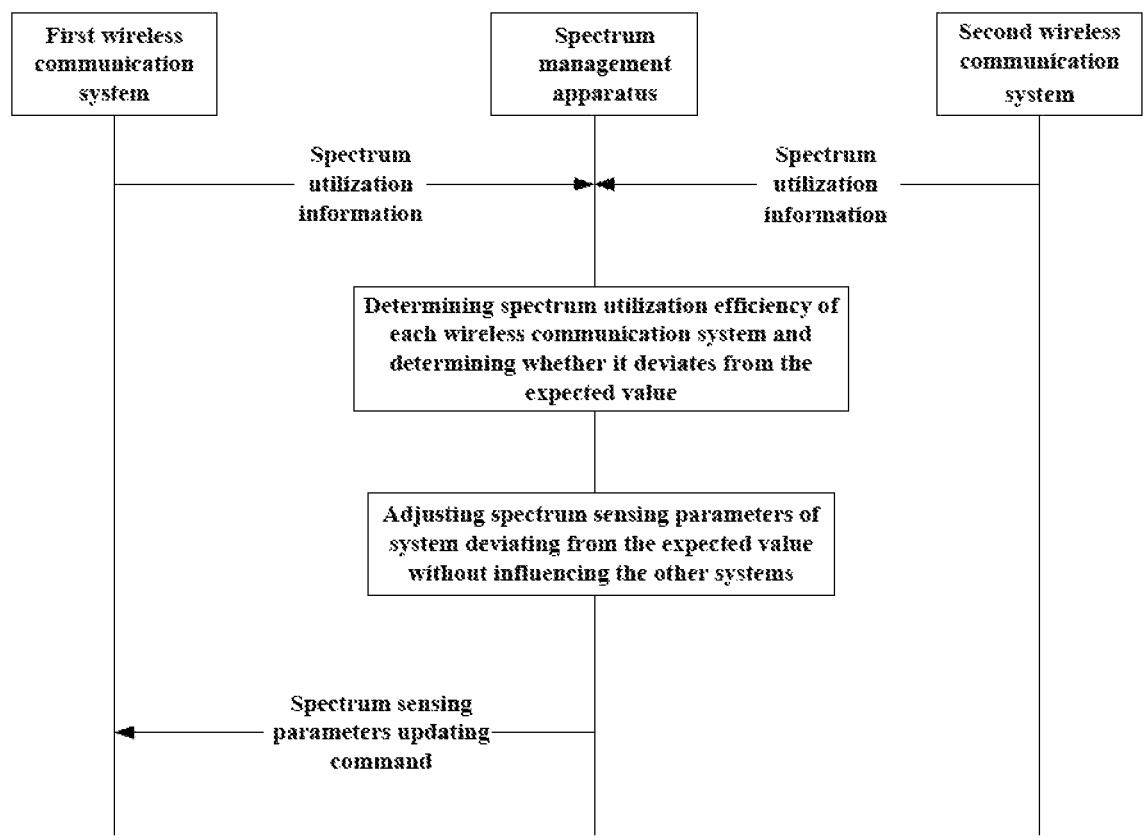
FIG. 10 illustrates an example of the information procedure between the spectrum management apparatus and the wireless communication systems.
Figure 11:
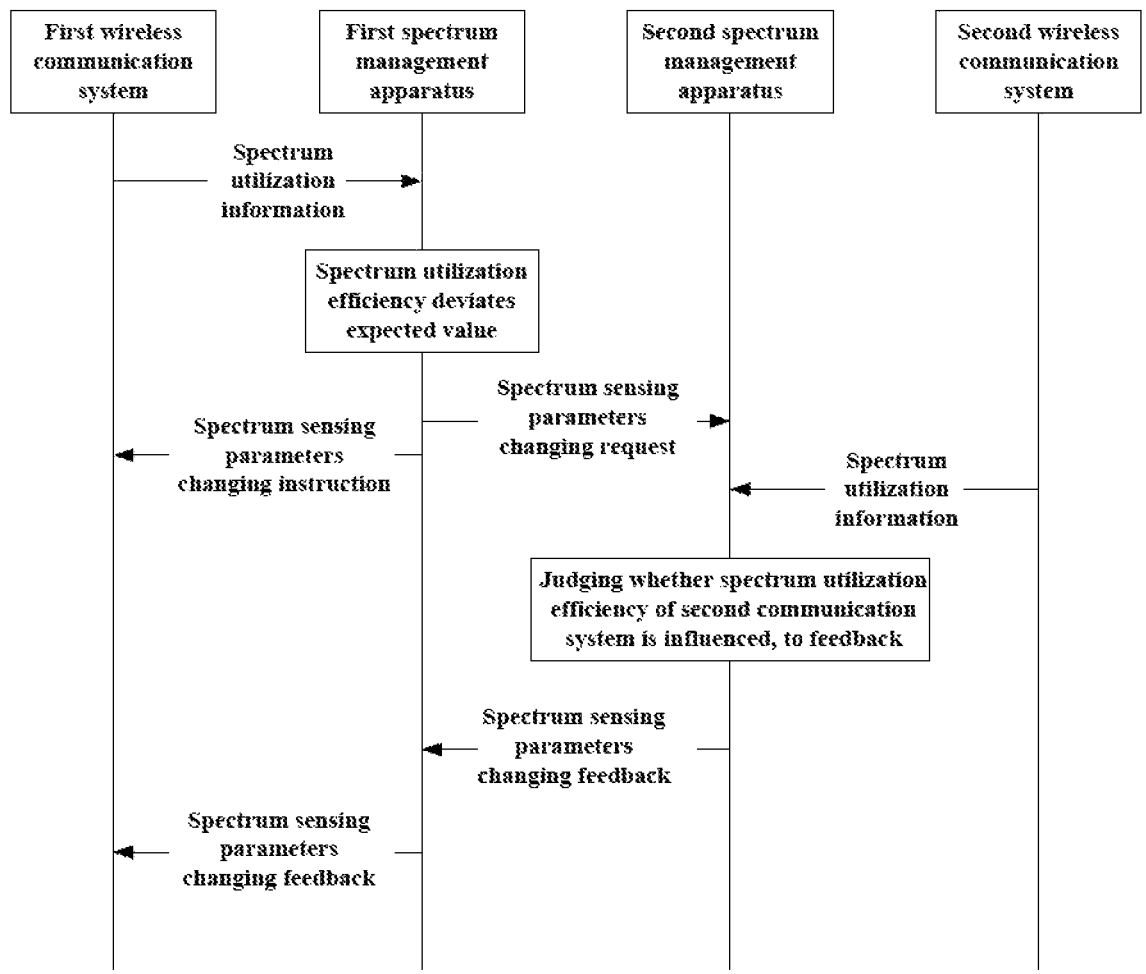
FIG. 11 illustrates another example of the information procedure between the spectrum management apparatus and the wireless communication systems.

For convenience of understanding, FIGS. 10 and 11 illustrate examples of the information procedure between the spectrum management apparatus and the wireless communication systems. It is to be noted that these are not limiting. In FIG. 10, the first wireless communication system and the second wireless communication system are managed by one spectrum management apparatus. The two wireless communication systems report their spectrum utilization information such as the information of activation status of each cell to the spectrum management apparatus, and the spectrum management apparatus determines the spectrum utilization efficiency of the two wireless communication systems based on such information. For example, assuming that the spectrum utilization efficiency of the first wireless communication system is lower than the expected value, while the spectrum utilization efficiency of the second wireless communication system is substantially equal to the expected value, according to the calculation of the system simulation model, the updated spectrum sensing parameters of the first wireless communication system are calculated without influencing the spectrum utilization efficiency of the second wireless communication system and a spectrum sensing parameters updating command is transmitted to the first wireless communication system.

In FIG. 11, an example where one spectrum management apparatus manages one wireless communication system and two spectrum management apparatus interact with each other is illustrated. The first spectrum management apparatus determines the spectrum utilization efficiency based on the acquired spectrum utilization information, and in the case of finding that the spectrum utilization efficiency deviates the expected value, adjusts the spectrum sensing parameters, that is, transmits a spectrum sensing parameters changing instruction to the first communication system, and issues a parameter changing request to the second spectrum management apparatus. The second spectrum management apparatus acquires, upon receiving this request, the spectrum utilization information from the managed second communication system, judges whether the spectrum utilization efficiency is influenced by the change of the spectrum sensing parameters of the first communication system, and provides a feedback to the first spectrum management apparatus based on the judgment. When the feedback indicates that the second communication system is not influenced, the first spectrum management apparatus instructs the first communication system to use the adjusted spectrum sensing parameters to operate, or no long provide any additional instruction to the first communication system. Otherwise, the first spectrum management apparatus instructs the first communication system to use the original spectrum sensing parameters to operate.

APPLICATION EXAMPLES

The technology of the present disclosure is applicable to various products. For example, the spectrum management apparatus 100 and 200 may be realized as any type of server such as a tower server, a rack server, and a blade server. The spectrum management apparatus 100 and 200 may be a control module (such as an integrated circuit module including a single die, and a card or a blade that is inserted into a slot of a blade server) mounted on a server.

In addition, the above mentioned base station 300 may be realized as any type of evolved Node B (eNB) such as a macro eNB and a small eNB. The small eNB may be an eNB such as a pica eNB, a micro eNB, and a home (femto) eNB that covers a cell smaller than a macro cell. Instead, the base station may be realized as any other types of base stations such as a NodeB and a base transceiver station (BTS). The base station may include a main body (that is also referred to as a base station apparatus) configured to control radio communication, and one or more remote radio heads (RRH) disposed in a different place from the main body. In addition, various types of terminals, which will be described below, may each operate as the base station by temporarily semi-persistently executing a base station function.

For example, the user device 400 may be realized as a mobile terminal such as a smartphone a tablet personal computer (PC), a notebook PC, a portable game terminal, a portable/dongle type mobile router, and a digital camera, or an in-vehicle terminal such as a car navigation apparatus. The terminal apparatus 300 may also be realized as a terminal (that is also referred to as a machine type communication (MIC) terminal) that performs machine-to-machine (M2M) communication. Furthermore, the user device 400 may be a radio communication module (such as an integrated circuit module including a single die) mounted on each of the terminals.

Application Examples Regarding Base Station

First Application Example

Figure 12:
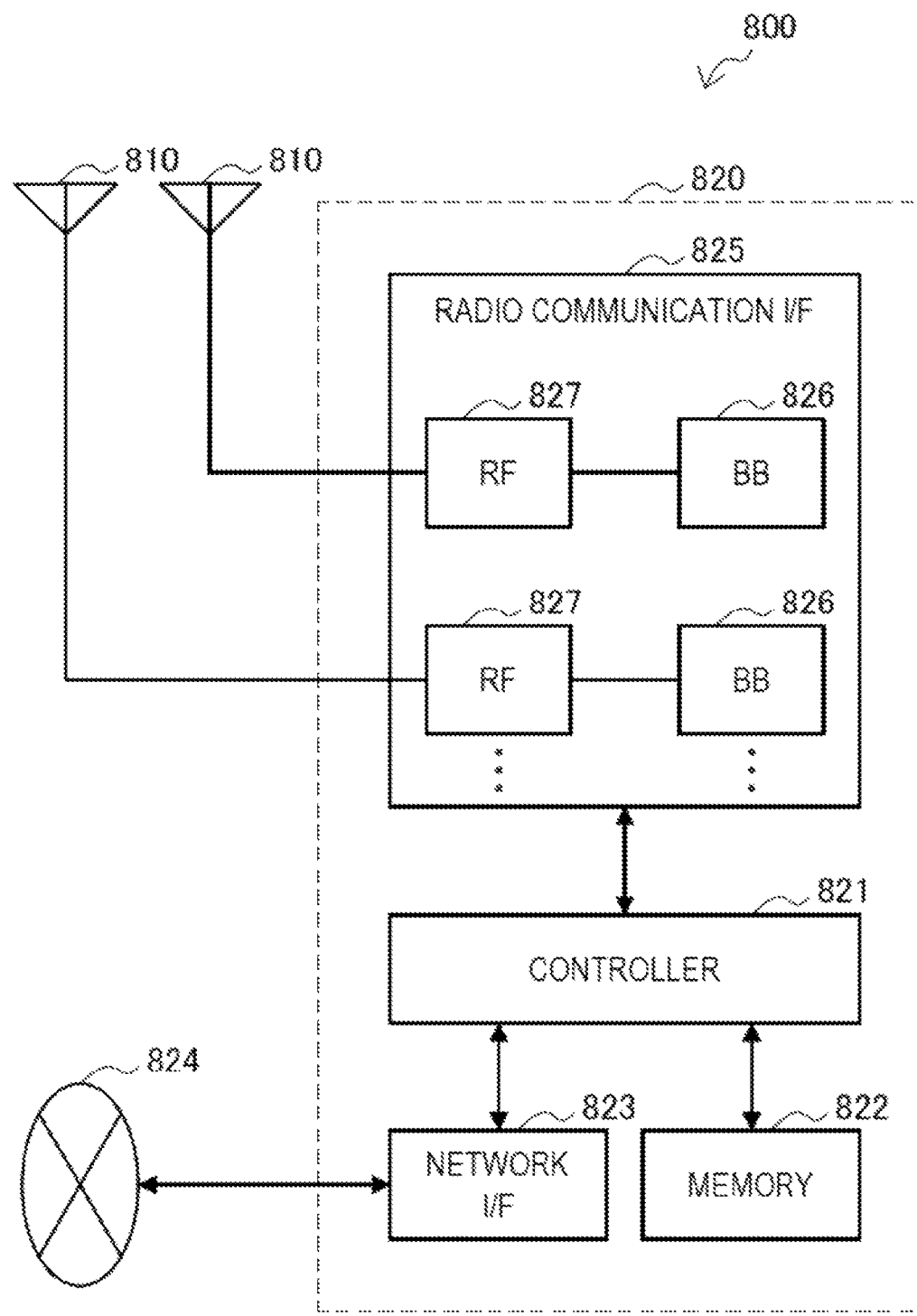
FIG. 12 is a block diagram illustrating a first example of a schematic configuration of an eNB to which the technology of the present disclosure can be applied.

FIG. 12 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 12. For example, the multiple antennas 810 may be compatible with multiple frequency bands used by the eNB 800. Although FIG. 12 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various tractions of a higher layer of the base station apparatus 820. For example, the controller 821 generates as data packet from data M signals processed by the radio communication interface 825, and transfers the generated packet via the network interface 823. The controller 821 may bundle data from multiple base band processors to generate the bundled packet, and transfer the generated bundled packet. The controller 821 may have logical filmdom of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 825 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 12. For example, the multiple BB processors 826 may be compatible with multiple frequency bands used by the eNB 800. The radio communication interface 825 may include the multiple RF circuits 827, as illustrated in FIG. 12. For example, the multiple RF circuits 827 may be compatible with multiple antenna elements. Although FIG. 12 illustrates the example in which the radio communication interface 825 includes the multiple BB processor's 826 and the multiple RF circuits 827, the radio communication interface 825 may also include a single BB processor 826 or a single RF circuit 827.

In the eNB 800 illustrated in FIG. 12, the transmitting unit 301 and receiving unit 302 described by using FIG. 5 may be implemented by the radio communication interface 825. At least a part of the functions may also be implemented by the controller 821. For example, the controller 821 can implement the judgment whether the predetermined frequency band is available by implementing the function of the judgment unit 303.

Second Application Example

Figure 13:
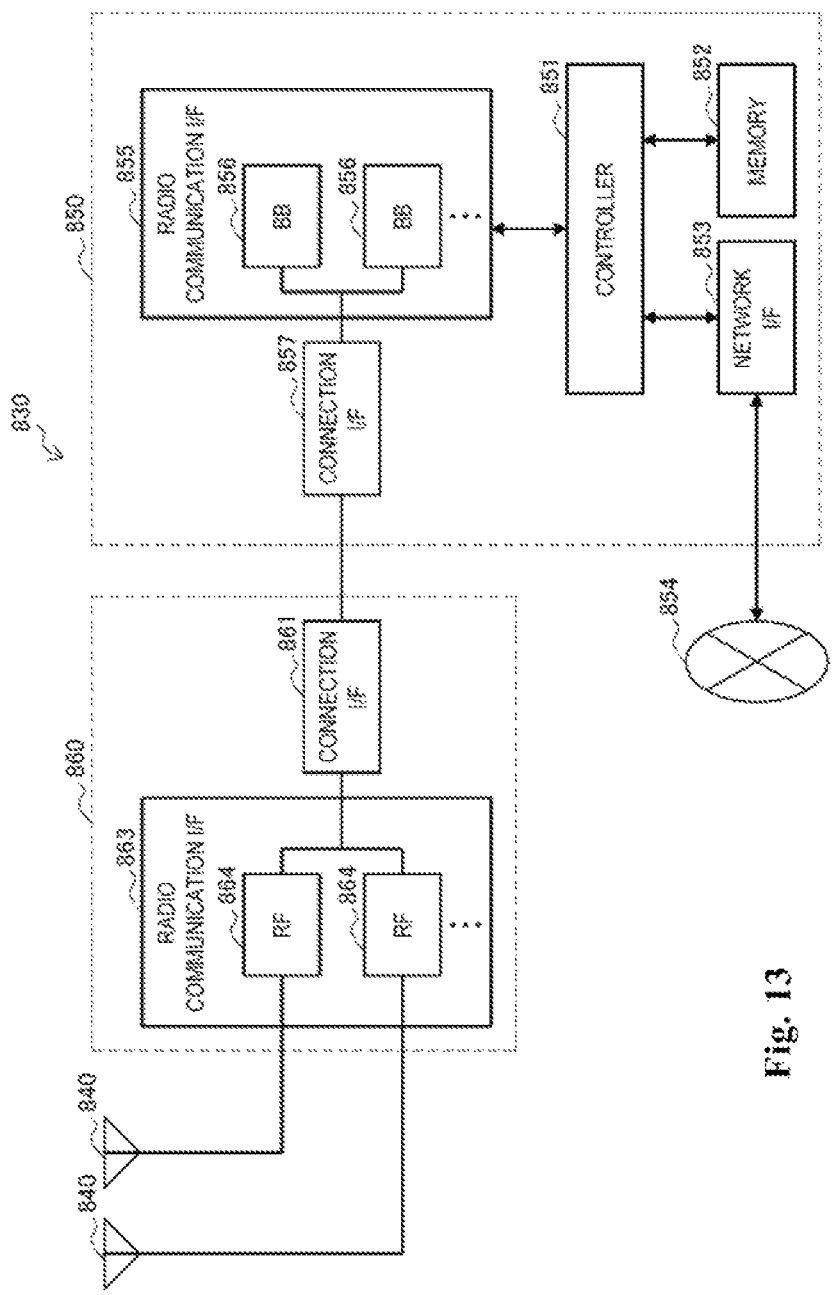
FIG. 13 is a block diagram illustrating a second example of a schematic configuration of an eNB to which the technology of the present disclosure can be applied.

FIG. 13 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 13. For example, the multiple antennas 840 may be compatible with multiple frequency bands used by the eNB 830. Although FIG. 13 illustrates the example in which the eNB 830 includes the multiple antennas 8210, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 12.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 12, except the BB processor 856 is connected to the RE circuit 864 of the RRH 860 via the connection interface 857. The radio communication interface 855 may include the multiple BB processors 856, as illustrated in FIG. 13. For example, the multiple BB processors 856 may be compatible with multiple frequency bands used by the eNB 830. Although FIG. 13 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864 as illustrated in FIG. 13. For example, the multiple RF circuits 864 may support multiple antenna elements. Although FIG. 13 illustrates the example in which the radio communication interface 863 includes the multiple RE circuits 864, the radio communication interface 863 may also include a single RF circuit 864.

In the eNB 830 illustrated in FIG. 13, the transmitting unit 301 and receiving unit 302 described by using FIG. 5 may be implemented by the radio communication interface 855 and/or the radio communication interface 863. At least a part of the functions may also be implemented by the controller 851. For example, the controller 851 can implement the judgment whether the predetermined frequency band is available by implementing the function of the judgment unit 303.

4-3. Application Examples Regarding User Device

First Application Example

Figure 14:
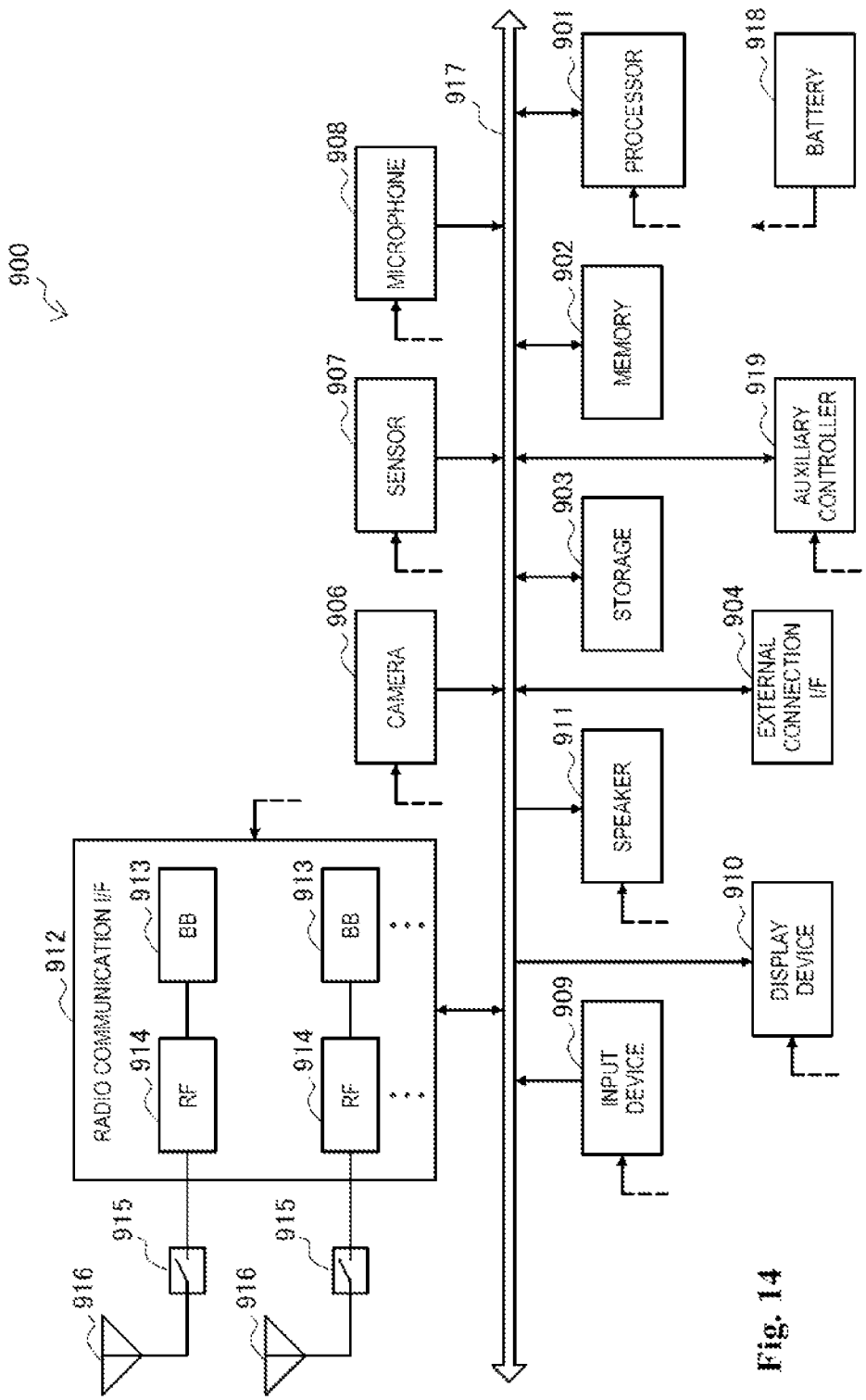
FIG. 14 is a block diagram illustrating an example of a schematic configuration of a smartphone to which the technology of the present disclosure can be applied.

FIG. 14 is a block diagram illustrating, an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LET and LTE-Advanced, and performs radio communication. The radio communication interface 912 may typically include, for example, a BB processor 913 and an RF circuit 914. The BB processor 913 may perform, for example, encoding/decoding, modulation/demodulating and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may be a one chip module having the BB processor 913 and the RE circuit 914 integrated thereon. The radio communication interface 912 may include the multiple BB processors 913 and the multiple RE circuits 914, as illustrated in FIG. 14. Although FIG. 14 illustrates the example in which the radio communication interface 912 includes the multiple BB processors 913 and the multiple RF circuits 914, the radio communication interface 912 may also include a single BB processor 913 or a single RE circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RE circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 14. Although FIG. 14 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 14 via feeder lines, which are partially shown as dashed lines in the figure. The auxiliary controller 919 operates a minimum necessary function of the smartphone 900, for example, in a sleep mode.

In the smartphone 900 illustrated in FIG. 14, the receiving unit 401 and the transmitting unit 403 described by using FIG. 6 may be implemented by the radio communication interface 912. At least a part of the functions may also be implemented by the processor 901 or the auxiliary controller 919. For example, the processor 901 or the auxiliary controller 919 can implement spectrum sensing by implementing the function of the sensing unit 402.

Second Application Example

Figure 15:
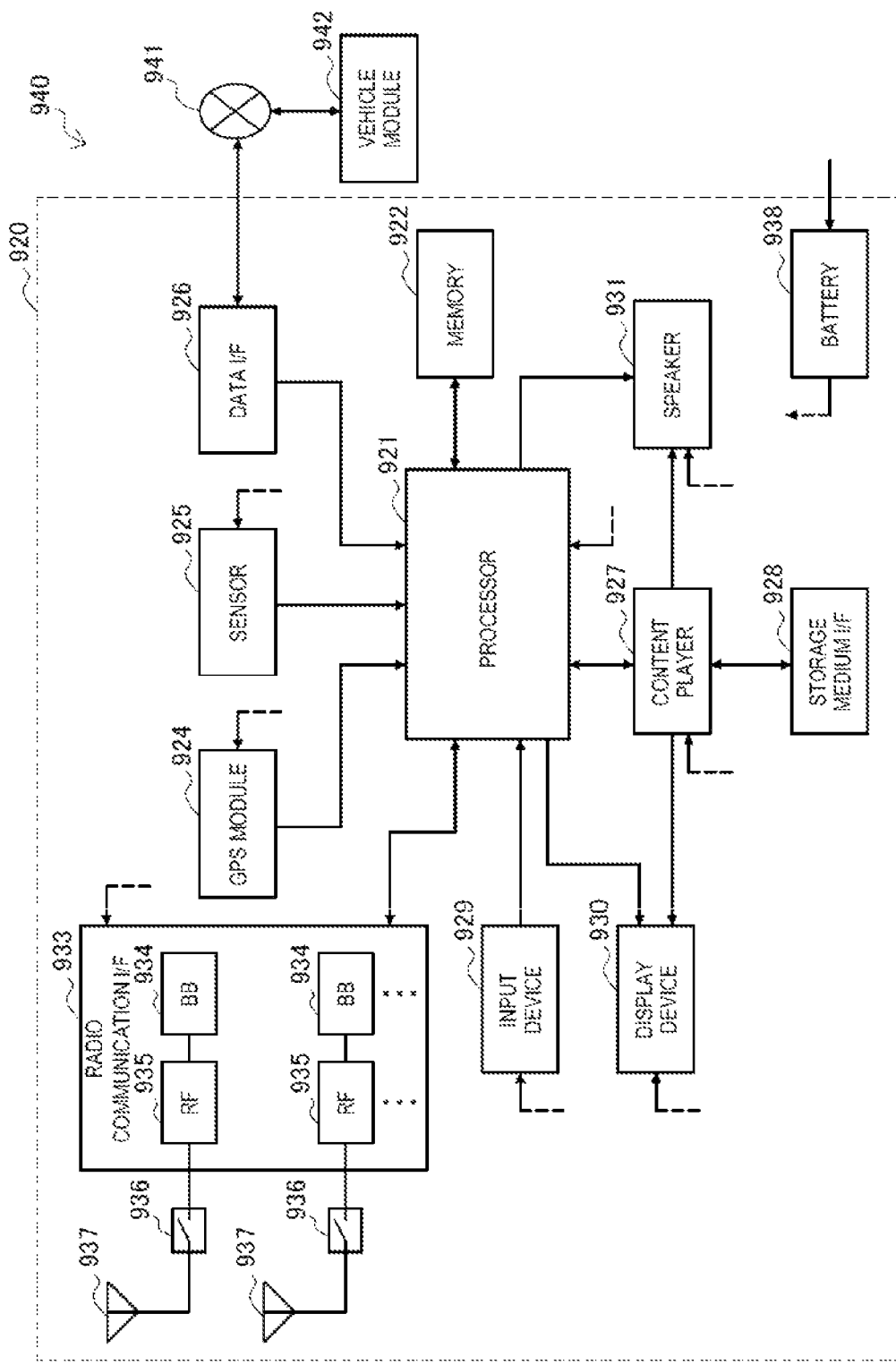
FIG. 15 is a block diagram illustrating an example of a schematic configuration of a car navigation apparatus to which the technology of the present disclosure can be applied.

FIG. 15 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LTE and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may also be a one chip module that has the BB processor 934 and the RF circuit 935 integrated thereon. The radio communication interface 933 may include the multiple BB processors 934 and the multiple RF circuits 935, as illustrated in FIG. 15. Although FIG. 15 illustrates the example in which the radio communication interface 933 includes the multiple BB processors 934 and the multiple RF circuits 935, the radio communication interface 933 may also include a single BB processor 934 or a single RE circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 15. Although FIG. 15 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 15 via feeder lines that are partially shown as dashed lines in the figure. The battery 938 accumulates power supplied form the vehicle.

In the car navigation apparatus 920 illustrated in FIG. 15, the receiving unit 401 and the transmitting unit 403 described by using FIG. 6 may be implemented by the radio communication interface 933. At least a part of the functions may also be implemented by the processor 921. For example, the processor 921 can implement spectrum sensing by implementing the function of the sensing unit 402.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

The basic principle of the present invention has been described above in conjunction with particular embodiments. However, as can be appreciated by those ordinarily skilled in the art, all or any of the steps or components of the method and apparatus according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

As can be appreciated by those skilled in the art, the modules in the above mentioned apparatus such as the determining unit, the adjusting unit, the sensing unit, the judgment unit, and so on can be implemented by one or more processors, while the modules such as the acquiring unit, the interaction unit, the transmitting unit, the receiving unit and so on can be implemented by circuit elements such as an antenna, a filter, a modem, a codec and so on.

Therefore the present application further provides an electronic device (1), including a circuit, configured to: acquire spectrum utilization information of at least one wireless communication system on a predetermined frequency band, determine, according to the spectrum utilization information, spectrum utilization efficiency of a corresponding wireless communication system; and adjust spectrum sensing parameters of the corresponding wireless communication system on the predetermined frequency band based on the spectrum utilization efficiency.

The present application further provides an electronic device (2), including a circuit, configured to: transmit spectrum utilization information of a cell served by a base station on a predetermined frequency band to a spectrum management apparatus; and receive change in spectrum sensing parameters from the spectrum management apparatus.

The present application further provides an electronic device (3), including a circuit, configured to: receive an instruction for performing spectrum sensing and corresponding spectrum sensing parameters from a base station; performing the spectrum sensing according to the spectrum sensing parameters in response to the instruction; and transmitting a result of the spectrum sensing to the base station.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 1600 shown in FIG. 16) from a storage medium or network, wherein the computer is capable of implementing various functions when installed with various programs.

Figure 16:
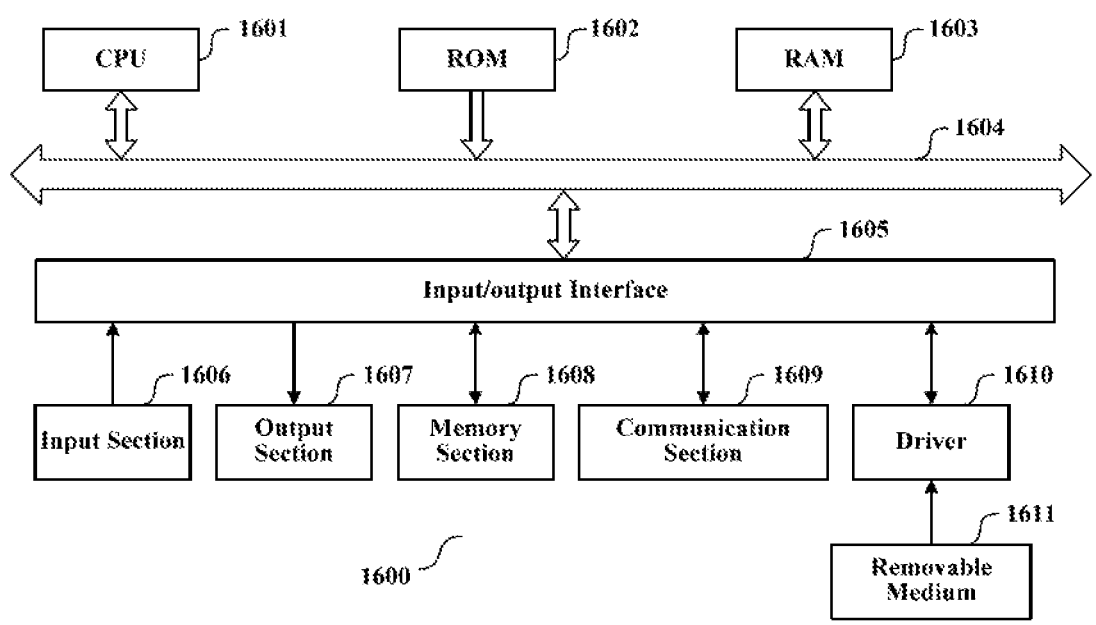
FIG. 16 is an exemplary block diagram illustrating the structure of a general purpose personal computer capable of realizing the method and/or apparatus and/or system according to the embodiments of the present invention.

In FIG. 16, a central processing unit (CPU) 1601 executes various processing according to a program stored in a read-only memory (ROM) 1602 or a program loaded to a random access memory (RAM) 1503 from a memory section 1608. The data needed for the various processing of the CPU 1601 may be stored in the RAM 1603 as needed. The CPU 1601, the ROM 1602 and the RAM 1603 are linked with each other via a bus 1604. An input/output interface 1605 is also linked to the bus 1604.

The following components are linked to the input/output interface 1605: an input section 1606 (including keyboard, mouse and the like), an output section 1607 (including displays such as a cathode ray tube (CRT), a liquid crystal display (LCD), a loudspeaker and the like), a memory section 1608 (including hard disc and the like), and a communication section 1609 (including a network interface card such as a LAN card, modem and the like). The communication section 1609 performs communication processing via a network such as the Internet. A driver 1610 may also be linked to the input/output interface 1605, if needed. If needed, a removable medium 1611, for example, a magnetic disc, an optical disc, a magnetic optical disc, a semiconductor memory and the like, may be installed in the driver 1610, so that the computer program read therefrom is installed in the memory section 1608 as appropriate.

In the case where the foregoing series of processing is achieved through software, programs forming the software are installed from a network such as the Internet or a memory medium such as the removable medium 1611.

It should be appreciated by those skilled in the art that the memory medium is not limited to the removable medium 1611 shown in FIG. 16, which has program stored therein and is distributed separately from the apparatus so as to provide the programs to users. The removable medium 1611 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1602 and the memory section 1608 in which programs are stored, and can be distributed to users along with the device in which they are incorporated.

To be further noted, in the apparatus, method and system according to the invention, the respective components or steps can be decomposed and/or recombined. These decompositions and/or recombinations shall be regarded as equivalent solutions of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. A spectrum management apparatus, comprising:
circuitry configured to
acquire spectrum utilization information of at least one wireless communication system on a predetermined frequency band;
determine, according to the spectrum utilization information, spectrum utilization efficiency of a corresponding wireless communication system; and
adjust, based on the spectrum utilization efficiency, spectrum sensing parameters of the corresponding wireless communication system on the predetermined frequency band, wherein
the spectrum sensing parameters comprise at least one of the following: an energy detection threshold for spectrum sensing, time duration for spectrum sensing, or a judgment criterion of spectrum sensing in the case of distributed spectrum sensing, and the circuitry is further configured to
acquire information indicating an identifier of each cell in the wireless communication system,
determine whether a cell in an active state and a cell failing to be activated are systems of the same type based on the information indicating the identifier of each cell in the wireless communication system, and
adjust the spectrum sensing parameters in response to the circuitry determining that a cell in the active state and the cell failing to be activated are systems of the same type.

2. The spectrum management apparatus according to claim 1, wherein, the spectrum utilization information comprises at least one of the following: information of actual activation status of each cell in the wireless communication system after spectrum sensing, throughput of the wireless communication system, and a signal to noise ratio of the wireless communication system.

3. The spectrum management apparatus according to claim 1, wherein, the circuitry is configured to adjust, in the case that the spectrum utilization efficiency deviates from an expected value, the spectrum sensing parameters of the corresponding wireless communication system, so that its spectrum utilization efficiency reaches the expected value.

4. The spectrum management apparatus according to claim 3, wherein, the circuitry is configured to perform the adjusting based on a preset system model, wherein, the preset system model comprises at least one of the following:

a channel model, a service model, a model of probability for spectrum activation of the system, a geographical location model.

5. The spectrum management apparatus according to claim 3, wherein, different expected values of spectrum utilization efficiency are set for wireless communication systems with different priority levels of utilizing the spectrum.

6. The spectrum management apparatus according to claim 3, wherein, the spectrum sensing parameters comprise an energy detection threshold, the circuitry is configured to, in the case of the spectrum utilization efficiency being higher than the expected value, decrease the energy detection threshold of the corresponding wireless communication system, and/or in the case of the spectrum utilization efficiency being lower than the expected value, increase the energy detection threshold of the corresponding wireless communication system.

7. The spectrum management apparatus according to claim 1, wherein, the number of the wireless communication systems managed by the spectrum management apparatus is two or more, and the circuitry is configured to adjust, with respect to a wireless communication system the spectrum utilization efficiency of which does not reach the expected value, the spectrum sensing parameters of the wireless communication system without influencing the spectrum utilization efficiency of the other wireless communication systems.

8. The spectrum management apparatus according to claim 7, the circuitry is configured to determine the spectrum utilization efficiency of the other wireless communication systems according to a system simulation model.

9. The spectrum management apparatus according to claim 1, wherein, the number of the wireless communication systems managed by the spectrum management apparatus is one, and the circuitry of the spectrum management apparatus is further configured to:
  interact with other spectrum management apparatus so that the circuitry performs the adjusting while taking into consideration the influence to the other wireless communication systems,
  wherein, the circuitry is configured to transmit a parameter changing request to the other wireless communication apparatus in the case that the circuitry has performed adjusting, and receive a feedback from the other wireless communication apparatus, and the circuitry further adjusts the spectrum sensing parameters according to the feedback,
  wherein, the feedback indicates whether the spectrum utilization efficiency of the wireless communication systems managed by the other spectrum management apparatus is influenced, and the circuitry is configured to, in the case that the feedback indicates that the spectrum utilization efficiency of the wireless communication systems managed by the other spectrum management apparatus is influenced, re-adjust the spectrum sensing parameters,
  in response to the circuitry receiving the parameter changing request from the other spectrum management apparatus, the circuitry acquires the spectrum utilization information of the wireless communication system, the circuitry determines the spectrum utilization efficiency of the wireless communication system and determines whether the spectrum utilization efficiency is influenced, and the circuitry provides the feedback indicating whether the spectrum utilization efficiency is influenced to the other spectrum management apparatus.

10. The spectrum management apparatus according to claim 1, wherein, the predetermined frequency band is an unlicensed frequency band and the circuitry is configured to acquire the spectrum utilization information via wireless communication in a licensed frequency band.

11. The spectrum management apparatus according to claim 7 is a geographical location database.

12. An apparatus comprising:
  processing circuitry for user device side of a wireless communication system, the processing circuitry configured to
  receive an instruction of corresponding spectrum sensing parameters from a base station, and perform spectrum sensing accordingly,
  perform the spectrum sensing according to the spectrum sensing parameters in response to the instruction, and
  transmit a result of the spectrum sensing to the base station; and
  base station circuitry configured to
  transmit spectrum utilization information of a cell, of the wireless communication system, served by the base station on a predetermined frequency band to a spectrum management apparatus, the use of the predetermined frequency band by the cell being based on the spectrum sensing performed by the processing circuitry of the user device, and
  receive a change in spectrum sensing parameters of the wireless communication system from the spectrum management apparatus, wherein
  the change in spectrum sensing parameters being changed based on spectrum utilization efficiency of the wireless communication system determined according to the spectrum utilization information.

* * * * *